(12) United States Patent
Mujjalintrakool

(10) Patent No.: US 10,847,939 B2
(45) Date of Patent: Nov. 24, 2020

(54) RECONFIGURABLE MODULAR POWER STATION

(71) Applicant: Suriyont Mujjalintrakool, Barrington, RI (US)

(72) Inventor: Suriyont Mujjalintrakool, Barrington, RI (US)

( * ) Notice: Subject to any disclaimer, the term of this patent is extended or adjusted under 35 U.S.C. 154(b) by 0 days.

(21) Appl. No.: 16/443,062

(22) Filed: Jun. 17, 2019

(65) Prior Publication Data

US 2019/0386442 A1    Dec. 19, 2019

Related U.S. Application Data

(60) Provisional application No. 62/685,298, filed on Jun. 15, 2018.

(51) Int. Cl.
| | | |
|---|---|---|
| *H01R 25/00* | (2006.01) | |
| *H01R 13/518* | (2006.01) | |
| *H01R 13/631* | (2006.01) | |
| *H02J 7/00* | (2006.01) | |

(52) U.S. Cl.
CPC ......... *H01R 25/006* (2013.01); *H01R 13/518* (2013.01); *H01R 13/631* (2013.01); *H02J 7/0042* (2013.01)

(58) Field of Classification Search
CPC ........ H02J 50/005; H02J 7/0044; H01R 3/00; H01R 27/02; H01R 27/00
USPC ......................................................... 439/638
See application file for complete search history.

(56) References Cited

U.S. PATENT DOCUMENTS

| | | | |
|---|---|---|---|
| 7,243,005 B1 * | 7/2007 | Beutler | A01G 25/16 137/624.11 |
| 2015/0340826 A1 * | 11/2015 | Chien | H01R 27/02 439/490 |
| 2019/0020156 A1 * | 1/2019 | Smith | G05F 3/02 |
| 2020/0021072 A1 * | 1/2020 | Govindasamy | H01R 27/00 |

\* cited by examiner

*Primary Examiner* — Jean F Duverne

(57) ABSTRACT

A reconfigurable modular power station is provided. The power station includes a mounting plate having a plurality of half moon cutouts. Also included is a half moon slot assembly. The half moon cutouts correspond to half moon slots in the half moon slot assembly. Each of the half moon slots include a power wire, a plurality of data wires, and a ground wire.

16 Claims, 4 Drawing Sheets

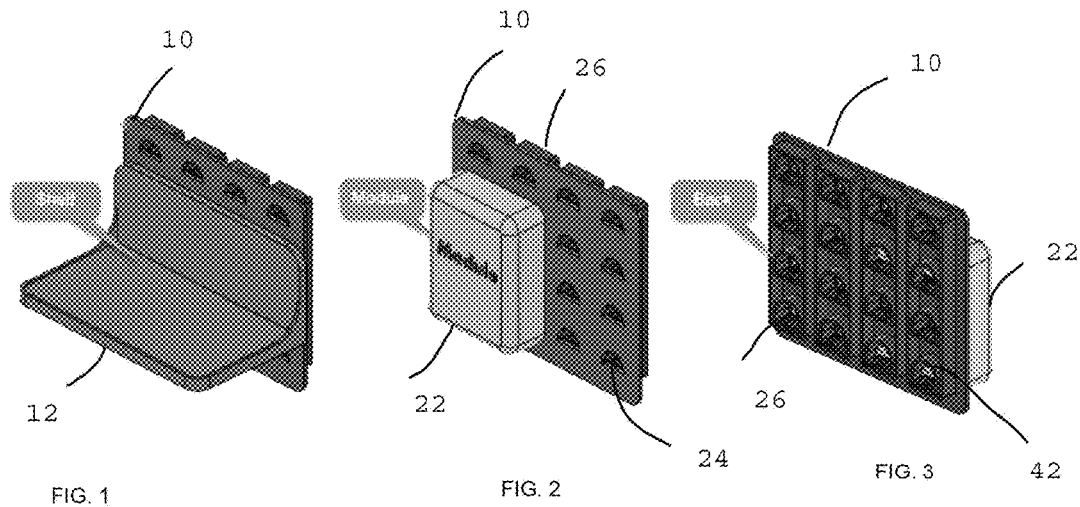
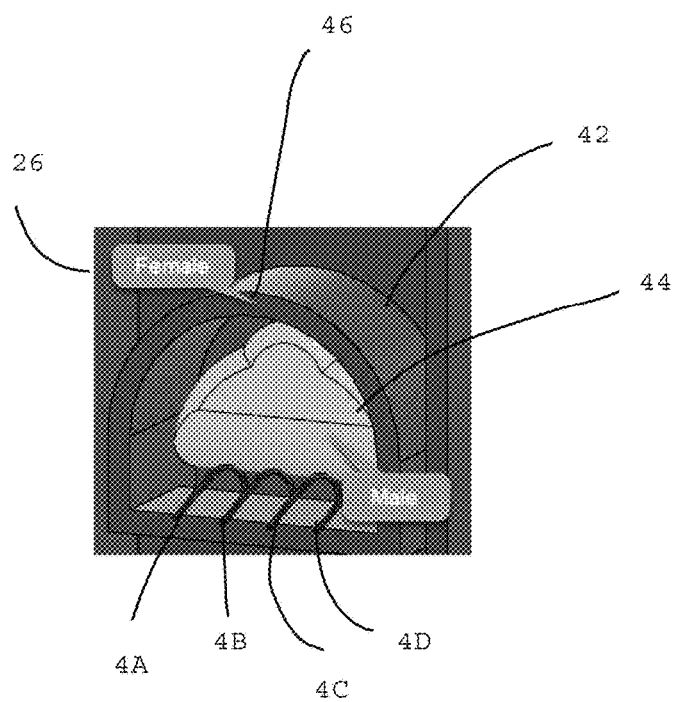

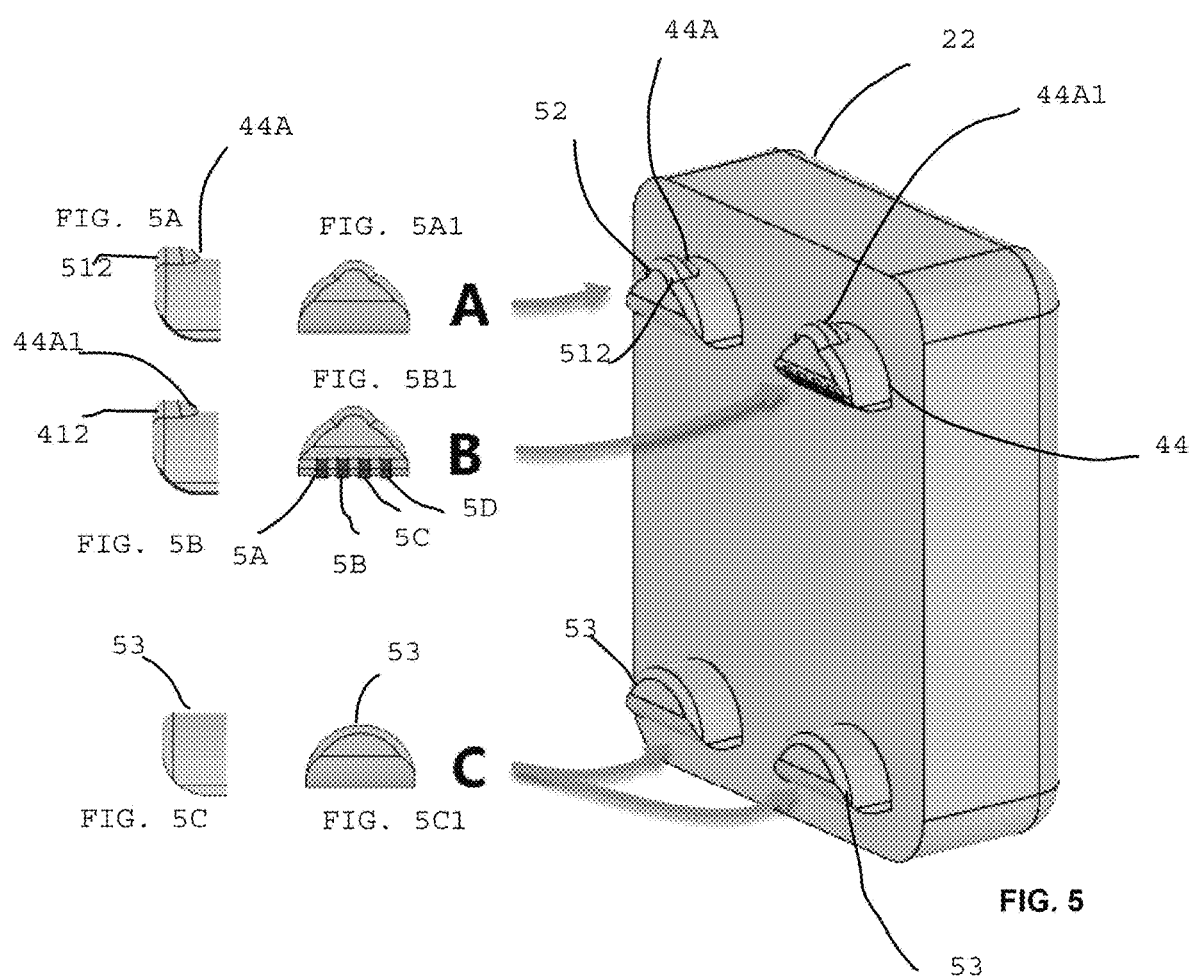

FIG. 6
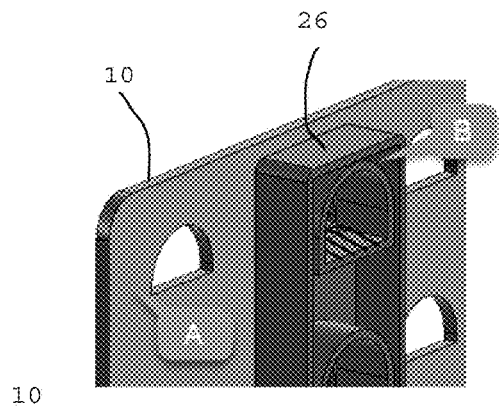
FIG. 7
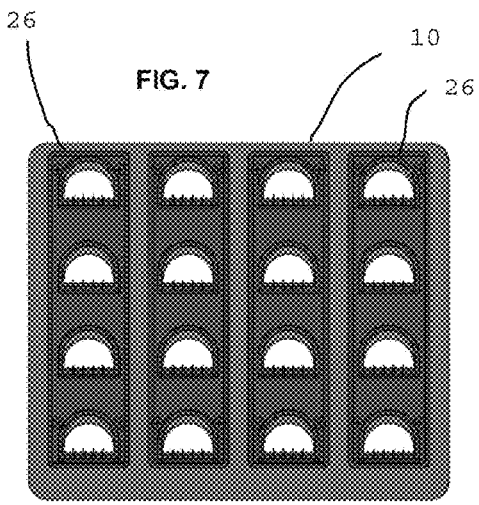
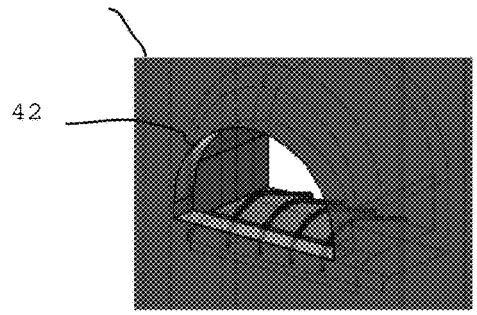
Front view with Wall
FIG. 8
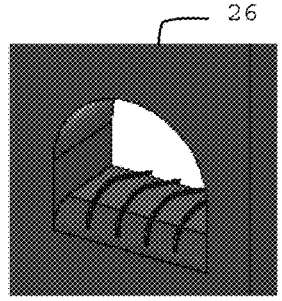
Front View
FIG. 9
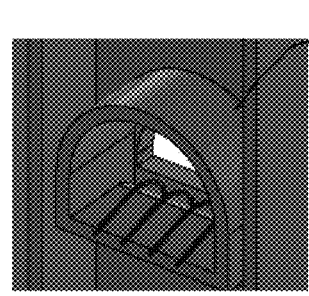
Back View
FIG. 10

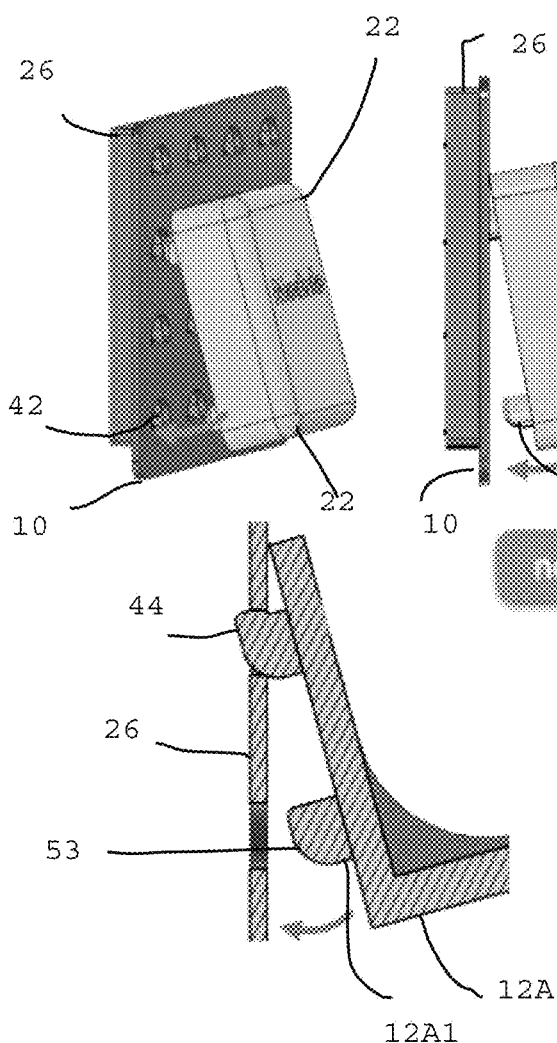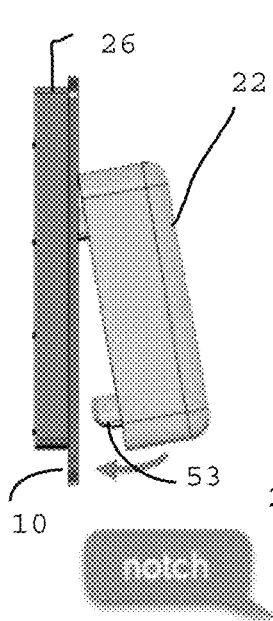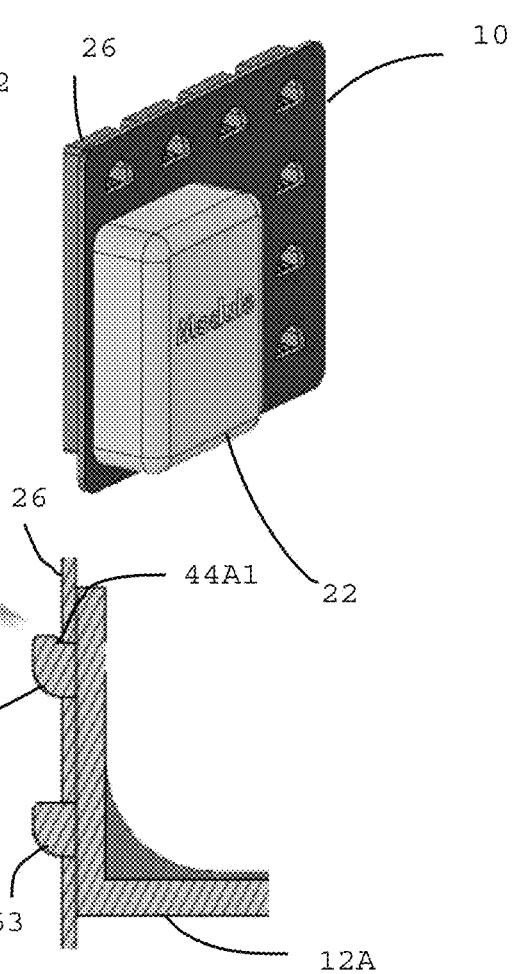
FIG. 11A FIG. 11B FIG. 11C
FIG. 12A FIG. 12B

RECONFIGURABLE MODULAR POWER STATION

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 62/685298, entitled "Reconfigurable Modular Power Station", naming Suriyont Mujjalintrakool as inventor, filed 15 Jun. 2018.

BACKGROUND

1. Field of Use

The invention relates to a reconfigurable modular power station for charging and/or powering and communicating with modular devices.

2. Description of Prior Art (Background)

In today's household there is a growing dependency on power devices and appliances. Each of these devices usually has its own power charger, either wireless or a power adapter. The multitude of devices and associated charging and/or powering methods results in a cluttered desktop. There is a need for storing such appliances in an orderly fashion, in a kitchen, workshop area, or the like. The need for recharging and/or powering such devices in an orderly and simple manner is desirable, especially if all of such appliances and tools can be charged at the same time by a common means or system in which selected devices or appliances can be removed for use without affecting the charging and/or powering operation of the remaining devices and appliances and, further, wherein additional devices and appliances can be added into the charging and/or powering system without changing that system.

BRIEF SUMMARY

It is a primary purpose and object of the present invention to address the aforementioned needs and therefore provide a multistation modular charging and/or powering and communication system for a plurality of cordless devices, such as cell phones, battery power packs, appliances, and the like.

Other and ancillary objects of the present invention have for their purpose to provide a multistation modular charging and/or powering system for charging and/of powering a plurality of battery operated cordless devices, such as cell phones, appliances and the like in which the multistation modular charging and/or powering system can be expanded upon or reduced by a desired number of modules, and in which each module within an array of modules cooperates with a cordless cell phone, appliance, battery power pack or the like to be charged as an independent unit so that a selected device can be removed from the station without affecting the charging and/or powering operation of the remaining devices.

Further, the module connectors making up the system according to the present invention are, in a preferred realization, substantially identical to each other. Further, each module can be marketed as a separate item associated with a particular appliance, cell phone, battery power pack or the like and be incorporated into a user's system. In addition, the system may be easily mounted on a wall or suspended from a shelf or cabinet.

The invention provides, as well, for manufacturing standardization in the fabrication of the multistation modular charging and or powering system thus enabling a high-volume low-cost production both for the charging and/or powering system and the cordless device handles used in conjunction with the system. Such standardization does not preclude, however, the custom design of a particular module and/or cordless device and/or its handle.

The invention can he seen as a multistation modular charging and/or powering system for charging and/or powering a plurality of units, each of which has at least one electric contact means therein for conducting DC current and/or data signals to/from the unit.

Each of the modules is provided with a releasable connection means for incorporating the respective electrical contact means of the respective units, when the units are in place.

The foregoing objects of the present invention, as well as others which are to become apparent from the text below taken in conjunction with the accompanying drawings, are achieved by the present invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following, detailed description taken in conjunction with the accompanying drawings in which:

FIG. 1 is a perspective view of the invention holding a shelf;

FIG. 2 is a perspective view of the invention holding a generic module;

FIG. 3 is a perspective rear view of the invention shown in FIG. 2;

FIG. 4 is a close up rear view of the wired female slot shown in FIG. 3;

FIG, 5 is a rear-view perspective of the generic module shown in FIG. 2;

FIG. 5A is a side view of the mounting peg shown in FIG. 5;

FIG. 5A1 is a rear view of the mounting peg shown in FIG. 5A;

FIG. 5B is a side view of the energized mounting peg shown in FIG. 5;

FIG. 5B1 is a rear view of the energized mounting peg shown in FIG. 5B;

FIG. 5C is a side view of the slot peg shown in FIG. 5;

FIG. 5C1 is a rear view of the slot peg shown in FIG. 5C;

FIG. 6 is a close up perspective view of a portion, of the invention shown in FIG. 2;

FIG. 7 is a rear view of the invention shown in FIG. 2

FIG. 8 is a close up view of female receiving slot shown in FIG. 2 for pegs shown in FIG. 5;

FIG. 9 is a front view of the female receiving slot shown in FIG. 8;

FIG. 10 is a back view of the female receiving slot shown in FIG. 9;

FIG, 11A, FIG. 11B, and FIG. 11C illustrate method for inserting module into slots as shown in FIGS. 2; and FIG. 12A and FIG. 12B are side views showing modular peg engagement with female receiving slots.

DETAILED DESCRIPTION

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Referring now to FIG. 1, and. FIG. 2, there is shown is a perspective view of the invention holding a shelf 12, holding a generic module 22, respectively. It will be understood that any suitable device or module, constructed in accordance the invention may be used. For example, shelf 12 may be a wireless charging and/or powering shelf module 22 may be a phone charger, accent lamp, desk lamp, cell phone, calculator, or any electrical or non-electrical device constructed in accordance with the invention.

Still referring to FIG. 1 and FIG. 2, and also FIG. 3 there is shown a mounting plate 10 and half moon slot assembly 26. Each half moon slot assembly 26 comprises at least one half moon female slot 42.

Referring also to FIG. 4 there is shown a close up rear view of the wired half moon female slot 42 shown in FIG. 3. Each female slot includes a power wire 4A, Data 1 wire 4B, Data 2 wire 4c and Ground wire 4D. It will be understood that any suitable order may be used. For example, the Ground wire could be 4A and the power wire could be 4D. The wires 4A-4D feed power to and communicate between accessories and a main controller (not shown). It will be appreciated that the half moon shape prevents polarity mismatch and helps guide male peg 44 into slot.

Still referring to FIG. 4, female slot 42 includes edge 46 Edge 46 may have a small cut out to help hold and stabilize male pegs discussed herein.

Referring also to FIG. 5 there is shown a rear-view perspective of the generic module 22 shown in FIG. 2. Generic module 22 includes mounting peg 52, energized or wired mounting peg 44 with power and data connectors 5A-5D, and stabilizing slot pegs 53. Mounting peg 52 includes notch area 44A for mating with female slot holding face 46 shown in FIG. 4. Similarly, peg 44 also includes notch area 44A1 for mating with holding face 46 shown in FIG. 4.

Referring also to FIG. 5A there is shown a side view of the mounting peg shown in FIG. 5. Also shown in FIG. 5A is notch area 44A. It will be appreciated that notch area 44A is formed by a small protuberance 5121 at edge of peg 52. FIG. 5A1 is a rear view of the mounting peg 52 shown in FIG. 5A.

Referring also to FIG. 5B there is shown a side view of the energized mounting peg 44 shown in. FIG. 5. Also shown in FIG. 5B is notch area 44A1. It will be appreciated that notch area 44A1 is formed by a small protuberance 412 at edge of peg 44.

Referring also to FIG. 5B1 there is shown a rear view of the mounting peg 44 shown in FIG. 5. Also shown in FIG. 5B1 are connectors 5A-5D. Connectors 5A-5D mate with wires 4A-4D shown in FIG. 4.

Referring also to FIG. 5C there is shown a side view of the stabilizing slot pegs 53shown in FIG. 5. FIG. 5C1 is a rear view of the stabilizing slot pegs 53 shown in FIG. 5C.

Referring also to FIG. 6 there shown a close up perspective view of a portion of the invention shown in FIG. 2. Half moon slot assembly 26 is attached to wall 10 by any suitable means. FIG. 7 is a rear view of the invention shown in FIG. 2 and includes wall 10 and a plurality of half moon slot assemblies 26.

FIG. 8 is a close-up view of female receiving slot 42 shown in FIG. 2 for pegs shown in FIG. 5: mounting peg 52, energized or wired mounting peg 44 with power and data connectors 5A-5D, and stabilizing slot pegs 53. FIG. 9 is a front view of the female receiving slot shown in FIG. 8. FIG. 10 is a back view of the female receiving slot shown in FIG. 9.

Referring also to. FIG. 11A, FIG. 11B, and FIG. 11C there is shown an illustration for inserting module 22 with mounting peg 52, energized or wired mounting peg 44 with power and data connectors 5A-5D, and stabilizing slot pegs 53 into slots 42 includes as shown in FIG. 2. It will be appreciated that slots 42 are able to receive any peg, e.g., mounting peg 52, energized or wired mounting peg 44 with power and data connectors 5A-5D, or stabilizing slot pegs 53. This, allows any module or shelf built in accordance with the present invention to be mounted anywhere on wall 10.

Referring also to FIG. 12A and FIG. 12 there are shown side views showing generic shell 12A having energized or wired mounting peg 44 with power and data connectors 5A-5D mating with female receiving slot 42, and stabilizing peg 53 mating with another female receiving slot 42. Generic shell is tilted at an angle to fit pegs 44, 53 into receiving slots 42. Generic shell is held in place by peg notch area 44A1 (and 44A not shown) and stabilizing peg 53. It will be appreciated that stabilizing peg 53 may also include a notch area 12A1 shown in FIG. 12A for further security.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. A reconfigurable modular power station comprising:
   a mounting wall, wherein the mounting wall comprises:
      a plurality of shaped cutouts;
   at least one shaped slot assembly mateable to the mounting wall, wherein the at least one shaped slot assembly comprises:
      a plurality of wired shaped female slots, wherein each of the plurality of wired shaped female slots corresponds to one of the plurality of shaped cutouts wherein each shaped female slot comprises:
a first power wire;
first plurality of data wires and a first ground wire;
wherein the first power wire, the first plurality of data wires, and the first ground wire are disposed in parallel along a lower edge of the shaped female slot.

2. The reconfigurable modular power station as in claim 1, wherein each shaped female slot comprises an edge disposed opposite the lower edge of the shaped female slot.

3. The reconfigurable modular power station as in claim 2 wherein the edge comprises a holding lace.

4. The reconfigurable modular power station as in claim 3 further comprising at least one module mateable to the at least one slot assembly through the mounting wall.

5. The at least one module as in claim 4 further comprises:
at least one mounting peg; and
at least one wired mounting peg.

6. The at least one module as in claim 5 wherein the at least one mounting peg comprises a holding notch for holding the mounting peg against the mounting wall.

7. The at least one module as in claim 4 further comprises:
at least one stabilizing slot peg.

8. The at least one module as in claim 5, wherein the at least one mounting peg further comprises a notch for mating with the corresponding holding face.

9. The at least one module as in claim 5, wherein the at least one wired mounting peg further comprises a notch for mating with a second corresponding holding face.

10. The at least one module as in claim 5 wherein the at least one wired mounting peg further comprises a second power wire, a second plurality of data wires, and a second ground wire for mating with the first power wire, the first plurality of data wires, and the first ground wire.

11. A modular power station comprising:
a mounting wall, wherein the mounting wall comprises:
a plurality of columns of shaped cutouts;
a slot assembly mateable to the mounting wall, wherein the slot assembly comprises:
a column of wired shaped female slots, wherein each of the wired shaped female slots corresponds to one of the plurality of column of shaped cutouts, wherein each of the shaped female slots comprises:
a first power wire;
a first plurality of data wires and a first ground wire; and
wherein the first power wire, the first plurality of data wires, and the first ground wire are disposed in parallel along a lower edge of the shaped female slot.

12. The modular power station as in claim 11, wherein each shaped female slot comprises an edge disposed opposite the lower edge of the shaped female slot and wherein the edge comprises a holding face.

13. The modular power station as in claim 12 further comprising at least one module mateable to the at least one slot assembly through the mounting wall, wherein the module comprises
at least one mounting peg; and
at least one wired mounting peg.

14. The at least one module as in claim 13, wherein the at least one mounting peg comprises a holding notch for holding the mounting peg against the mounting wall.

15. The at least one module as in claim 13, wherein the at least one mounting peg further comprises a notch for mating with the corresponding holding face.

16. The at least one module as in claim 13 wherein the at least one wired mounting peg further comprises a second power wire, a second plurality of data wires, and a second ground wire for mating with the first power wire, the first plurality of data wires, and the first ground wire.

* * * * *